United States Patent [19]

Hall

[11] Patent Number: 4,682,549
[45] Date of Patent: Jul. 28, 1987

[54] METHOD AND AN ARRANGEMENT FOR PURIFYING AND RECOVERING HEAT ENERGY FROM FLUE GASES FROM REFUSE INCINERATION

[75] Inventor: Lars Hall, Lidingö, Sweden
[73] Assignee: Ragn-Sellsforetagen AB, Sweden
[21] Appl. No.: 820,733
[22] Filed: Jan. 21, 1986
[30] Foreign Application Priority Data
    Jan. 23, 1985 [SE] Sweden ............................ 8500314
[51] Int. Cl.$^4$ ............................................. F23J 11/00
[52] U.S. Cl. .................................. 110/345; 110/216;
    165/134.1; 122/20 B; 62/238.6; 237/2 B;
    55/269
[58] Field of Search .............. 122/20 B; 110/216, 234,
    110/345; 165/134 DP, 134.1; 62/238.6; 237/2
    B; 55/269, 268, 267

[56] References Cited

U.S. PATENT DOCUMENTS 4,502,626  3/1985  Gerstmann et al. .......... 122/20 B X
4,557,202 12/1985  Warner ........................ 122/20 B X

FOREIGN PATENT DOCUMENTS 0066416  5/1981  European Pat. Off. .
3245559  7/1984  Fed. Rep. of Germany .

Primary Examiner—Henry A. Bennet
Attorney, Agent, or Firm—Laff, Whitesel, Conte & Saret

[57] ABSTRACT

A method of purifying flue gases from refuse incineration by cooling and of recovering heat energy as well as an arrangement for performing the method. According to the method the flue gases are cooled in three stages, with the most beneficial structural material with regard to the temperature range, process conditions, and economy being selected in each cooling stage among the materials glass, plastic or alloyed steel. The sizes of the various cooling surfaces are determined such, that the temperatures of the flue gases immediately before the last cooling stage lie closely above the water dew point. The arrangement disclosed by the invention comprises a first cooling member, a second cooling member connected thereto, and a third cooling member connected to the latter and having its outlet connected to a droplet separator which is followed by a flue gas fan which in turn is connected to a chimney. The first and second cooling members can preferably mainly consist of glass and plastic and the third cooling member can mainly consist of alloyed steel.

6 Claims, 1 Drawing Figure

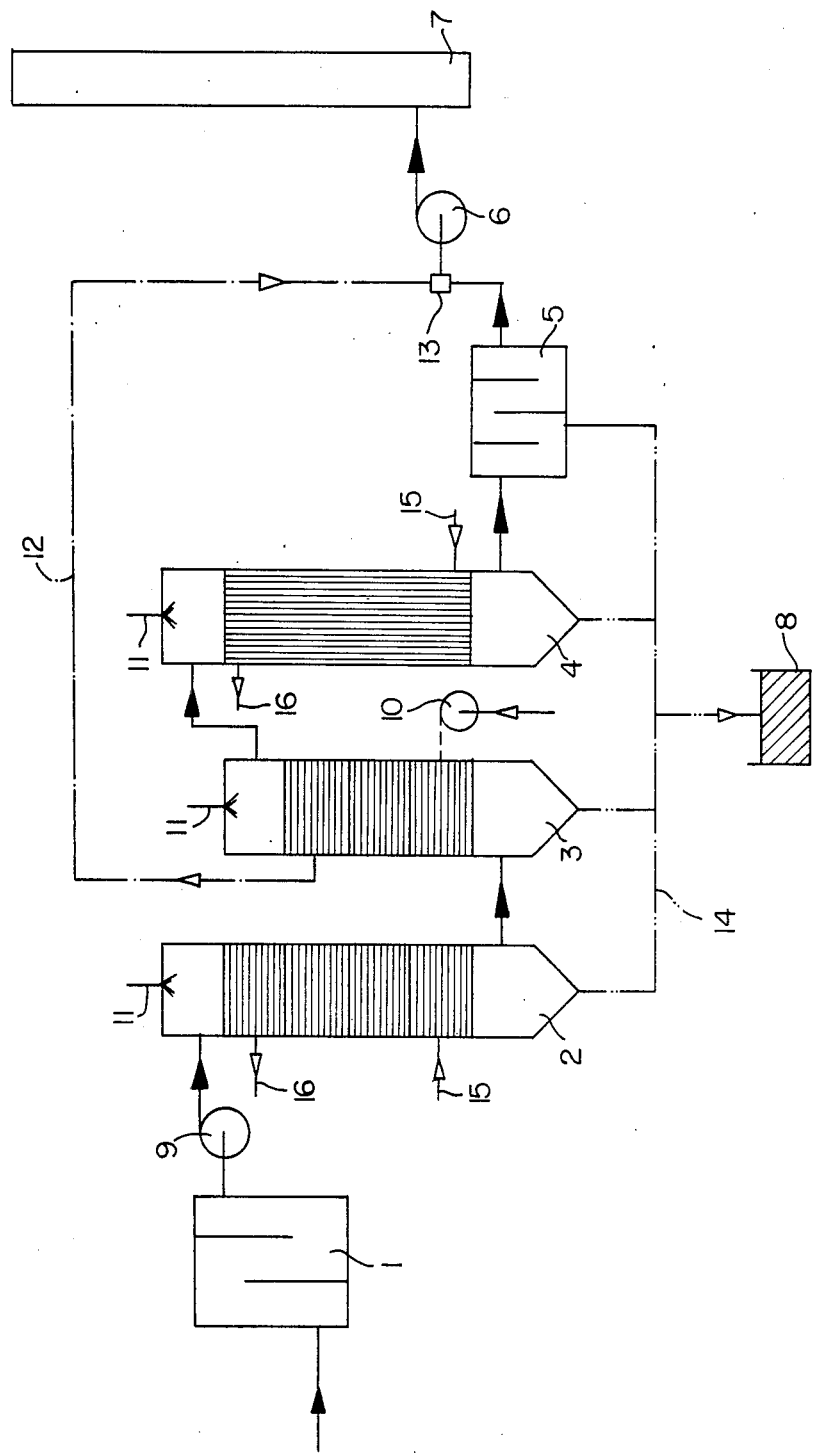

METHOD AND AN ARRANGEMENT FOR PURIFYING AND RECOVERING HEAT ENERGY FROM FLUE GASES FROM REFUSE INCINERATION

BACKGROUND OF THE INVENTION

1. Field of the Invention

The present invention refers to a method of purifying flue gases from refuse incineration by cooling them and for recovering heat energy and to an arrangement for performing the method. In the purifying, acid components, such as hydrochloric acid and various sulphuric oxides as well as dust, heavy metals and other detrimental substances, are separated. The recovered heat energy may be utilized for example in a water system for heating.

2. Description of the Prior Art

It is known that flue gases from the combustion of conventional fuels, such as oil, coal, wood and peat, can be purified by being cooled to a temperature lying below the dew point. Some acid components, such as $SO_3$ and $SO_2$, are separated at the time of condensation together with water. Heat can be recovered simultaneously and can either be transferred directly to a hot water system for example for heating rooms or alternatively the temperature of the heat energy is increased by means of a heat pump and can in such manner be transferred to a water system for heating. Cooling the flue gases generally is performed in one single stage from the initial temperature (150°–250° C.) to the final temperature (30°–80° C.).

Flue gases from refuse incineration include hydrochloric acid, and a very corrosive condensate is formed when cooling the flue gases to a temperature below the dew point. This condensate is much more aggressive than condensate from cooling flue gases of the fuels mentioned above. Also, the dew point is generally lower for flue gases from refuse as compared for example to oil. Another difference between refuse and other fuels is that refuse as a rule is a very cheap fuel, and therefore it is in most cases not profitable to utilize a heat pump for recovering heat energy from the flue gases.

For cooling different types of flue gases in the temperature range in which condensation can occur (generally lower than 150° C.) three different types of material have generally been used, namely alloyed steels, glass and plastics or plastic-covered metallic material.

In cooling flue gases from refuse incineration it has turned out to be difficult for alloyed steels to withstand the corrosive attack if the concentration of the hydrochloric acid in the condensate and the temperature become too high. In order to obviate this it has been necessary to utilize cooling water having a temperature of 25°–35° C. when cooling is performed in one stage, with the temperature of the tube wall also being kept low, and not only hydrochloric acid but also a great amount of water condenses, with the concentration of hydrochloric acid becoming acceptably low. The disadvantage is that the heat energy of the cooling water lies at a low level (25°–35° C.), and if the energy is to be transferred for example to a district heating system this has to be done by means of a heat pump. The procedure of utilizing coolers of alloyed steel in for example two stages and withdrawing a cooling water having a higher temperature, for example 70° C., cannot be applied in view of the danger of corrosion.

Glass is resistant to hydrochloric acid, and with a cooler of glass tubes it is possible to obtain cooling water having a temperature of for example 70°, wherein the heat energy may be transferred directly to a district heating system. A substantial number of types of plastic are also resistant to hydrochloric acid, but only a small number can withstand the high temperatures that the flue gases have in the beginning of the cooling process. Two relatively temperature resistant types of plastics are teflon and polyvinylidene fluoride, but the high cost of these types of plastics reduces the possibilities of utilizing them in the entire cooler structure when cooling flue gases from refuse incineration.

A disadvantage of glass and plastics is their poor heat transmission capacity as compared to alloyed steels. This becomes particularly noticeable in temperatures below the dew point in which the coefficient of thermal conductance is affected more by the heat conduction capacity of the material than at temperatures above the point at which condensation of moisture begins.

In cooling the flue gases in one stage down to below the dew point it is necessary either to make use of a corrosion resistant chimney or to heat the flue gases by 10° C. to 20° C. to prevent the chimney from corroding. Reheating the flue gases is the most common way of solving this problem, and if the heat energy has been produced by means of for example a heat pump this procedure becomes quite expensive.

SUMMARY OF THE INVENTION

In order to remedy the weaknesses mentioned above of the facilities for cooling flue gases from refuse incineration which are known today the cooling should be carried out in several stages, at least two or appropriately three stages.

In the first stage the flue gases are cooled by water in a cooler of glass and/or plastic, with the temperature of the outgoing cooling water being adjusted such, that heat energy can be transferred directly without the aid of a heat pump to for example a district heating system.

In a second stage the flue gases are cooled by air in a cooler of glass and/or plastic. The flue gases are cooled to a temperature closely above the water dew point. The heated air is thereafter mixed with the flue gases after the last cooling stage, whereby a mixture of air and flue gases is reached which is dry and which does not cause corrosion problems in the flue gas fan, chimney, etc.

In a third stage the flue gases are cooled by water, wherein the material of this cooler can be alloyed steel, glass or plastic. As i.a. moisture condensates on the cooling surfaces in this stage, the use of alloyed steel provides much better transmission of heat as compared to the other materials. Since the temperature of the flue gases lies close to the water dew point right at the inlet to this cooling stage the concentration of hydrochloric acid in the condensate and the temperature of the cooling surface always are low, which strongly reduces the danger of corrosion of the alloyed steel. For alloyed steels it is also an advantage from the viewpoint of corrosion that the cooling surface always is maintained moist, and therefore the condensate or some other liquid can be recirculated to the top of the cooler and over its components which are contacted by the flue gases. These surfaces are thereby also kept clean from any dust coatings.

The temperature of the cooling water that is utilized is at such a low level in this third stage that it usually cannot be used directly in a heating system. In order to take advantage of the heat energy in the cooling water a heat pump then has to be used. If this is not economically profitable and cooling the flue gases down to this low temperature is necessary from the viewpoint of the environment, the heat energy of the cooling water has to be removed in other manner, for example in a cooling tower or by water from a lake, spring or stream.

BRIEF DESCRIPTION OF THE DRAWING

An example of an embodiment of the arrangement in accordance with the invention including typical temperatures will be described below with reference to the accompanying drawing.

DETAILED DESCRIPTION

In the drawing the designation 1 refers to a waste heat boiler, 2 is a first cooler, 3 is a second cooler, and 4 is a third cooler.

The designation 5 refers to a droplet separator, 6 is a flue gas fan, 7 is a chimney and 8 is a collecting vessel. The designation 9 refers to a flue gas fan, 10 is an air fan, 11 are sprinklers or shower heads, 12 is a conduit for conveying air, 13 is a mixing point, and 14 is a conduit for condensate. The designations 15 and 16 refer to coolant water conduits.

The flue gases from the waste heat boiler 1, which should be provided with electrostatic precipitators and an economizer known per se, have a temperature of 160° C. and are cooled to approximately 80° C. in the cooler 2 which consists of glass tubes and specific plastic components. The temperature of the cooling water is increased from 65° to approximately 70°-80° C. in this process.

In the second cooler 3, which also consists of glass tubes and plastic components, the flue gases are cooled by air, with the temperature of the flue gases being lowered to approximately 55°-65° C. The air flow is two thirds of the flue gas flow, and in this example the temperature of the air has been calculated to increase from 10° to 45° C. The amount of air used for the cooling varies with the time of the year and comprises approximately 40% to 80% of the amount of flue gases.

In a third stage the flue gases are cooled in the tube cooler 4 of alloyed steel, for example of the type Avesta 254 SMO, down to 40° C. The temperature of the cooling water that is used at that time increases from approximately 30° to 35° C. The heat energy of this cooling water can be recovered by a heat pump if required. Alternatively the heat energy is cooled off in a cooling tower, a stream, a lake, etc.

After the third and last cooling stage the flue gases continue to the droplet separator 5 which may be made of alloyed steel or plastic and in which the remaining drops of condensate of the flue gases are separated. After this the flue gases are mixed with the air heated in the cooler 3 of the second cooling stage, whereupon the flue gases pass the flue gas fan 6 and are expelled to the atmosphere through the chimney 7.

In the third stage a condensate containing water, hydrochloric acid, sulphuric oxides, dust, heavy metals and other compounds is formed. A condensate can also be formed in the two first cooling stages. Furthermore, the various cooling surfaces are sprayed with condensate or some other liquid i.a. in order to be kept clean and free of coatings. The condensates and other liquids are collected in the collecting vessel 8 and are treated by neutralizing and precipitation, with a sludge being formed which i.a. contains various heavy metals. The sludge is dewatered and dealt with.

It is important that the cooling surface on the flue gas side is maintained moist the entire time by being sprayed with condensate or other liquid, and the sprinklers or shower heads 11 have the purpose of doing this by supplying said condensate or other liquid to the upper part of the various coolers. The conduit 12 for conveying air supplies heated air from the second cooler to the mixing point 13, from which said air is conveyed together with flue gases from the droplet separator 5 to the flue gas fan 6. Conduit 14 conveys condensate from coolers 2, 3, and 4 to the collecting vessel 8. Conduits 15 are used for supplying cooling water, whereas conduits 16 are used for removing cooling water.

What is claimed is:

1. A method of purifying by cooling flue gases from refuse incineration and of recovering heat energy therefrom, wherein said cooling is carried out in three steps, comprising
   a first step of cooling said flue gases with water within a first glass and plastic cooler means, said cooling in said first step being carried out at approximately 80° C.,
   a second step of cooling the outflow of said first cooler with air within a second glass and plastic cooler means, said cooling in said second step being carried out at a temperature of substantially 55°-65° C. and close above the water dew point of the flue gas, said second step including varying the amount of air used for the cooling to be about 40% to 80% of the total volume of flue gas in dependence upon the period of the year, and of heating the resulting air to about 40°-50° C.,
   a third stage of cooling the outflow of said second cooler with water within a third alloyed steel cooler means, wherein the flue gases are additionally cooled to about 35°-45° C. so as to heat the cooling water to about 30°-35° C.,
   and transferring the heat energy of said cooling water to a district heating system by means of a heat pump.

2. The method in accordance with claim 1, comprising the added step of mixing the air heated in said second cooling means with the flue gases after the gases have passed through said third cooling means so as to obviate corrosion problems in a following fan and chimney.

3. The method in accordance with claim 2, comprising the added step of continuously maintaining a moist cooling surface on the flue gas side of said third cooling means by spraying it with a condensate.

4. The method claim 1 wherein said alloyed steel is of the type described as "Avesta 254 SMO".

5. A system for cooling and purifying flue gases from refuse incineration and for recovering heat energy therefrom, said system comprising
   first glass and plastic cooling means,
   second glass and plastic cooling means,
   third alloyed steel cooling means,
   droplet separator means,
   flue gas fan means, and
   chimney means,
   said first cooling means including an inlet from a waste heat boiler and an outlet to said second cooling means, said first cooling means having water as its cooling medium, said second cooling means including an outlet to said third cooling means, said third cooling means having air as its cooling medium, said third cooling means including an outlet to said droplet separator means, said third cooling means having water as its cooling medium, said droplet separator means being connected to said flue gas fan means, and said flue gas fan means being connected to said chimney means.

6. The system of claim 5 wherein said alloyed steel is of the type described as "Avesta 254 SMO".

* * * * *

UNITED STATES PATENT AND TRADEMARK OFFICE
CERTIFICATE OF CORRECTION

PATENT NO. : 4,682,549
DATED : July 28, 1987
INVENTOR(S) : Lars Hall

It is certified that error appears in the above-identified patent and that said Letters Patent is hereby corrected as shown below:

Col. 5, line 4, "said third cooling" should read --said second cooling--.

Signed and Sealed this

Eighth Day of March, 1988

Attest:

DONALD J. QUIGG

Attesting Officer　　　　Commissioner of Patents and Trademarks